Figure 1:
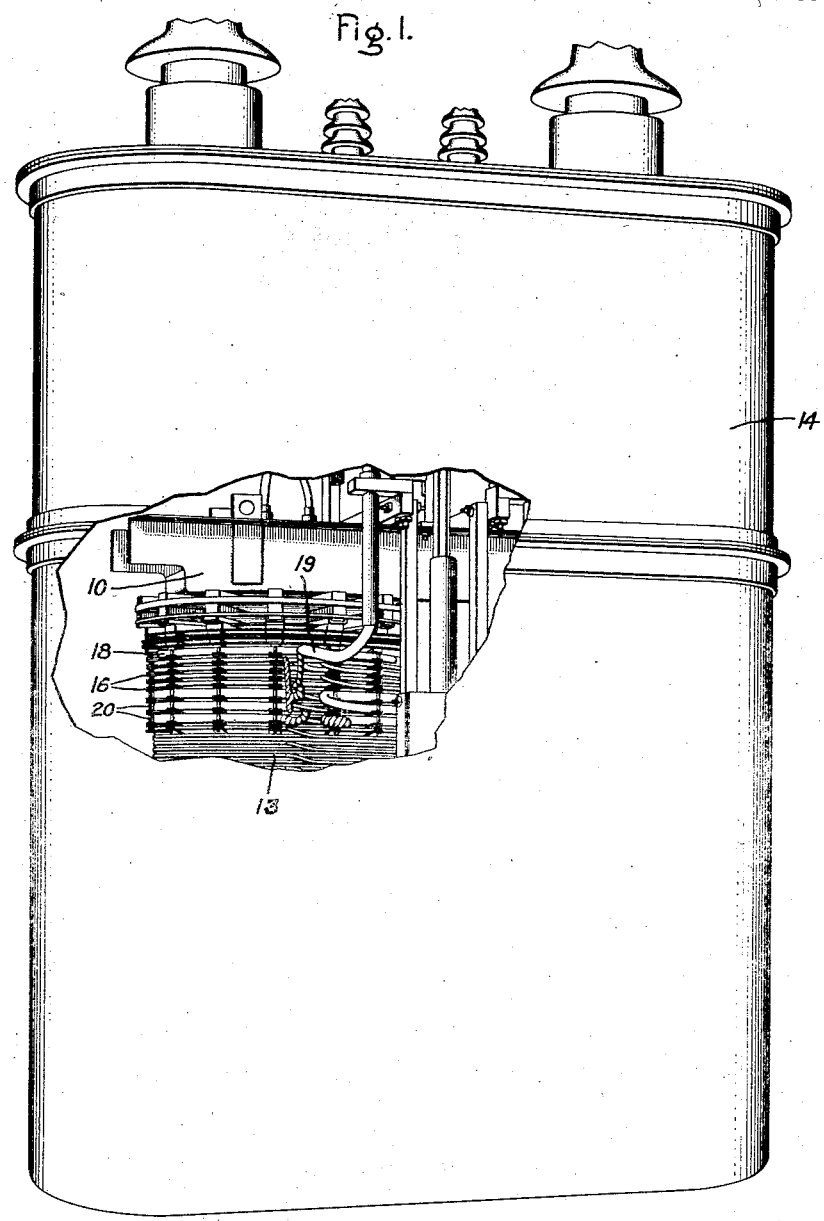

Inventors:
James M. Weed,
Jack R. Meador,
by Harry E. Dunham
Their Attorney.

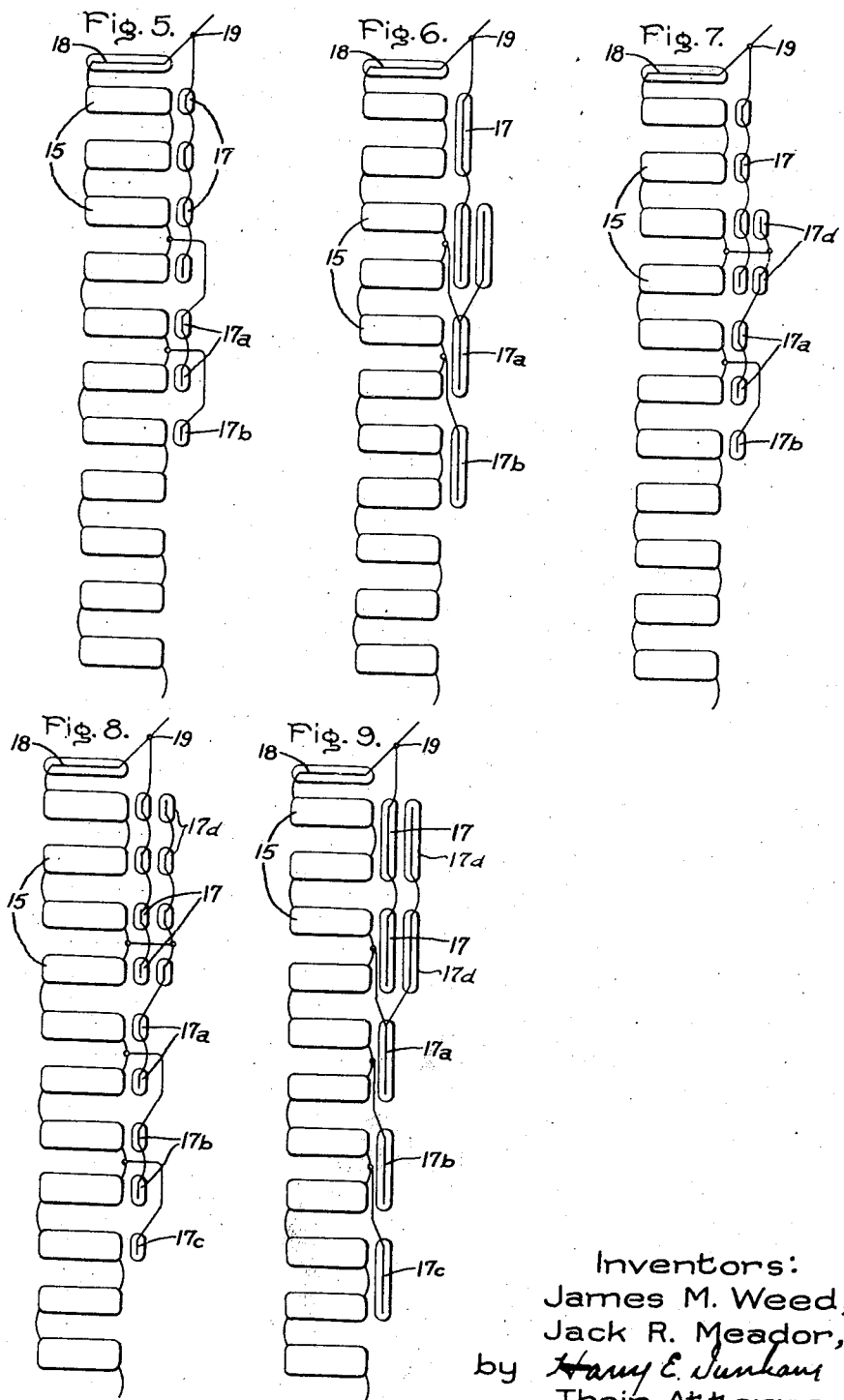

Patented Apr. 7, 1942

2,279,027

UNITED STATES PATENT OFFICE 2,279,027

ELECTRICAL INDUCTION APPARATUS

James M. Weed, Ballston Lake, N. Y., and Jack R. Meador, Pittsfield, Mass., assignors to General Electric Company, a corporation of New York Application April 20, 1937, Serial No. 137,918
Renewed June 20, 1940

12 Claims. (Cl. 175—356)

Our invention relates to electrical induction apparatus such as transformers and reactors. A winding of this type of apparatus is often connected to a circuit in which high voltage transients may be produced by lightning, switching operations or other causes. When such a high voltage transient reaches the terminal of the winding, the voltage across the winding is suddenly raised to a very high value. The initial distribution of this high voltage throughout the winding depends upon the capacitance network of the winding and, because of the capacitance to ground of the various turns or coils, those turns and coils which are near the terminal, in the case of a simple winding, are subjected to much more than their proportional share of this voltage at the first instant. But, after a very short time, the voltage distribution becomes uniform. In reaching the voltage corresponding to this uniform gradient, the voltage of every part of the winding goes through a series of damped oscillations of a fundamental frequency which is characteristic of the winding, combined with various harmonics, with the result that high transient voltages, to ground, between coils and between turns, appear in numerous places throughout the winding. These conditions are fully explained in the James M. Weed Patent No. 1,585,448, issued May 18, 1926, wherein arrangements of electrostatic shields are disclosed for neutralizing the effect of the capacitance between the winding and ground and so assuring a uniform initial distribution of the suddenly impressed voltage. With this uniform initial distribution of voltage, each part of the winding is subjected only to its proportional share of the total voltage and no oscillations can occur to cause high voltage stresses anywhere within the winding. While a uniform initial distribution of a suddenly impressed voltage is ideally desirable, it is of course obvious that the conditions inherent in a simple winding may be improved by any arrangement of electrostatic shields which will make the initial distribution approximately uniform or even more nearly uniform than it would be without the shields. An effective arrangement of electrostatic shields consists of conductive strips connected to the line terminal and disposed near the winding to supply capacitance currents which will neutralize at least portions of the capacitance currents from the winding to ground, thus effecting a more uniform initial distribution of a suddenly impressed high voltage.

The general object of the invention is to provide an improved electrostatic shield for improving the initial distribution of a high voltage suddenly impressed at the terminal of a winding of a transformer or other similar electric induction apparatus.

Figure 2:
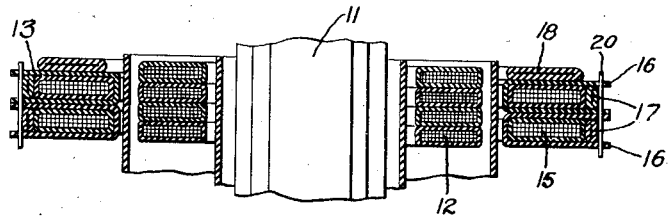
Figure 3:
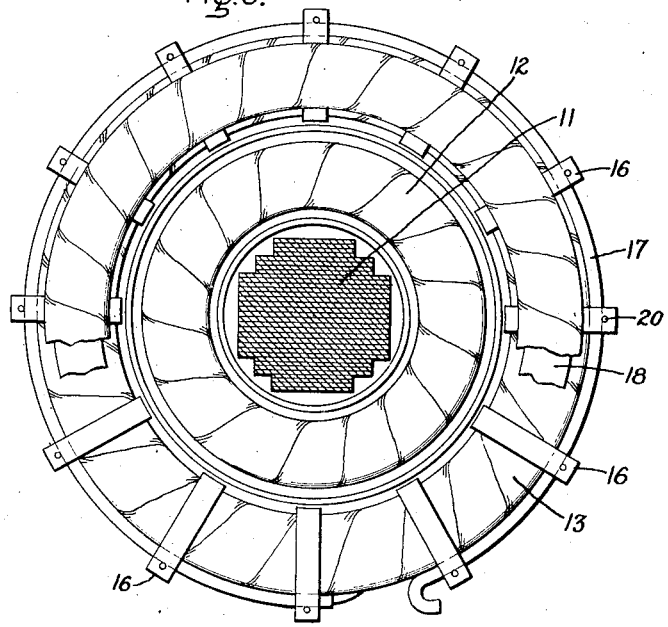
Figure 4:
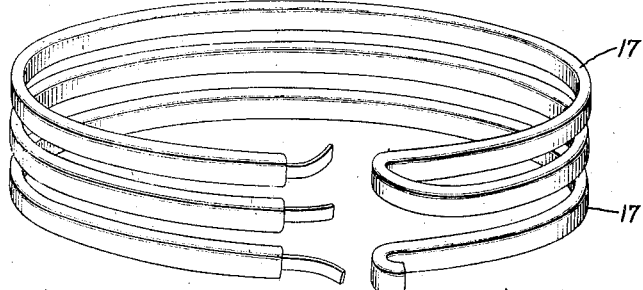

The invention and its advantages will be better understood from the following description taken in connection with the accompanying drawings in which Fig. 1 is a view of an encased transformer provided with an electrostatic shield in accordance with the invention, part of the casing being broken away to show a portion of the transformer; Fig. 2 is a sectional view of a small portion of the windings of the transformer shown in Fig. 1; Fig. 3 is a plan view of the windings; Fig. 4 is a perspective view of one form of an electrostatic shield arranged in accordance with the invention; and Figs. 5 to 9 inclusive are explanatory views indicating various forms and applications of electrostatic shields arranged in accordance with the invention.

Like reference characters indicate similar parts in the different figures of the drawings.

The transformer shown in Fig. 1 includes a magnetic core 10 having a winding leg 11 surrounded by a low voltage winding 12 and a high voltage winding 13, the transformer being enclosed in a casing 14. The high voltage winding 13 is formed of a plurality of spaced annular or disk coils 15 which are maintained in spaced relation by spacing strips 16 extending radially between the coils. The winding 13 is shielded by a series of electrostatic shields comprising insulated conductive strips or ribs 17 disposed along the outer edges of the annular coils 15 forming a predetermined fractional part of the winding 13 nearest its high voltage terminal. An insulated annular electrostatic plate 18 may also be provided over the end of the winding 13 nearest its high voltage terminal. This end plate 18 should of course be split at one side to avoid a short circuit turn around the winding leg 11 of the magnetic core. The electrostatic plate 18 and at least the electrostatic strip 17 at the edge of the first coil 15 are connected to the high voltage terminal 19 of the winding. There can of course never be any very great difference between the voltage of the first electrostatic strip 17 and the adjacent edge of the first or line coil 15. The voltages between the succeeding coils 15 and their corresponding electrostatic strips 17, however, will increase until finally a considerable amount of insulation is needed between the strip 17 and its coil 15.

In order that the insulation for the electrostatic strips need not be progressively increased as the shielding extends farther along the coil stack from the high voltage terminal, the plurality of strips are divided into a series of groups surrounding successive portions of the winding part and connected to it at appropriate points to establish successively lower voltages on the respective groups. For example, in the arrangement shown in Fig. 5, the first shield comprising four electrostatic strips 17 surrounding the highest voltage portion of the winding or the first four coils nearest the high voltage terminal is connected directly to the high voltage terminal 19 of the windings. The next shield comprising the group of electrostatic strips 17a surrounding the next successive winding portion is connected, for raising its voltage to the desired value, to an intermediate point of the winding portion which is closely coupled electrostatically with the first shield 17. The third shield 17b surrounding the next successive winding portion is connected, for establishing its voltage, to a point in the winding portion which is closely coupled with the electrostatic shield 17a. When a high transient voltage is suddenly impressed upon the high voltage terminal 19 of the winding, the voltage of the first shield 17 will be instantly raised to the terminal voltage and will supply charging currents to the winding coils closely coupled electrostatically therewith. The capacitance between the ribs and the coils adjacent thereto is such that these charging currents will instantly raise the voltages of these coils to the desired values. The shield 17a, being connected to the joint between the winding coils underneath the last two strips of the preceding shield 17, will instantly be raised to the voltage of the outside turns of these coils. This voltage will of course be somewhat less than the voltage of the first shield due to the voltage drop between the shield 17 and these coils. Similarly, the next succeeding shield 17b will be charged to a potential corresponding with that portion of the winding underneath the preceding shield 17a to which it is connected. It is obvious therefore that the second and third shields, 17a and 17b, are in effect charged through condensers of which the high voltage element comprises the preceding shield and the low voltage element comprises the surface of the winding portion underneath the end of the preceding shield. The various coils of the winding are supplied with the desired charging currents but it is obvious that the voltage of the electrostatic shield 17a is considerably below that of the terminal 19 and the first shield 17, while the voltage of 17b is still lower, so that the insulation necessary for these shields 17a and 17b is not excessive. All of the shields may therefore be arranged relatively closely adjacent the corresponding winding coils whereby a high space factor for the winding and shields is maintained.

The arrangement indicated in Fig. 7 is similar to that of Fig. 5 except that the second shield 17a is provided with a pair of additional electrostatic strips 17d surrounding a portion of the preceding shield 17. The effect of this extension of shield 17a is to provide additional capacitance between shield 17 and shield 17a so that the latter shield may be raised to the necessary voltage without disposing the shield 17 too closely to the coils 15 which they surround. The shield 17a therefore in effect overlaps the lower portion of the preceding shield 17 so that charging currents may be transmitted directly thereto from shield 17 as well as from the coils 15 underneath the last two strips of the shield 17.

The arrangement shown in Fig. 6 is similar to that shown in Fig. 7 except that each electrostatic strip of the various shields is wide enough to cover two of the coils 15 and thus to take the place of two of the electrostatic strips such as are shown in Figs. 5 and 7. These electrostatic strips of double width may be used if they do not interfere with proper circulation of a cooling medium such as a suitable insulating liquid through the space between the adjacent coils 15.

The arrangement shown in Fig. 8 is similar to that of Fig. 7 except that the shielding is extended over a greater number of winding portions or coils, and is particularly applicable in the case of higher voltage windings. It will be noted that the shield 17b comprises two electrostatic strips surrounding two corresponding winding coils, and an additional shield 17c is provided surrounding the next succeeding winding coil. Since greater charging currents will be required to be transmitted from the first shield 17 through the second shield 17a for the succeeding shields, the shield 17a completely overlaps the first shield 17, four additional electrostatic strips 17d being provided, one overlapping each of the strips of the shield 17 providing sufficient capacitance therebetween.

The arrangement shown in Fig. 9 is similar to that shown in Fig. 8 except that electrostatic strips 17, 17a, 17b, 17c and 17d of double width are used. It may of course be desirable in some cases to use electrostatic strips of various widths as indicated clearly in Fig. 1 where strips of both single and double width are shown.

The electrostatic strips are indicated in detail in Fig. 4. The bottom strip shown in this figure is a simple insulated strip adapted to surround a single winding coil. One end of this strip is of course arranged for direct and substantially non-inductive connection to a point higher up in the winding. Its other end is curved back as shown from the coil which it surrounds so as to avoid a concentration of electrostatic stress which might produce corona. The upper strip shown in Fig. 4 is arranged to surround the outer edges of two adjacent winding coils. This strip extends from one terminal along the edge of one coil and then is bent back in a smooth curve to continue along the edge of an adjacent coil as shown.

The electrostatic strips which have been described never carry any load current but only a small charging current so that they are never subjected to any considerable force tending to destroy them or separate them from the winding coils which they surround. A convenient arrangement for holding the electrostatic strips in place is to extend the spacing strips 16 beyond the electrostatic strips 17 and lock the electrostatic strips in place by small pins or rods 20 extending through the outer ends of the spacing strips 16 and engaging the outer surfaces of the electrostatic strips 17 as shown most clearly in Figs. 2 and 3.

The invention provides a simple and convenient arrangement of electrostatic shields which is extremely effective in obtaining a more uniform initial distribution of suddenly impressed transient voltages within the winding of a transformer or other similar electric induction apparatus and without the necessity of insulating the entire shielding structure for the full transient voltage. In all of the various shielding arrangements described the shielding is applied to only the initial fractional part of the total winding, the extent of which part may vary depending upon conditions and the particular voltage gradient desired across the winding. By distributing a part of the impressed voltage at a reduced gradient over the initial part of the total winding with properly arranged electrostatic shields, the voltage gradient that can occur over the remainder of the winding will be well within the normal insulation levels thereof. Thus while the shielding is restricted to only a part of the total winding, ample protection against high voltage gradients for the entire winding is obtained in a relatively inexpensive and efficient manner.

As will be seen in the drawings, each of the points of connection from a winding portion, such as a surface or outer portion, is made to a capacitance element or rib at a point in the winding which is at a higher voltage during normal operation of the apparatus than any part of the winding which is electrostatically coupled with the shield to which the point is connected, or each of the successive shields is connected to a point of the winding of higher voltage than any portion of the winding with which it is closely coupled electrostatically. Thus, taking two shields arranged adjacent successive portions of the winding, one being connected to the high voltage line, means are provided for connecting the second shield to the winding between the lower voltage end of the portion of the winding adjacent the first shield and the high voltage terminal. A convenient point in the winding from which to make connection to the shields, as will be seen in the drawings, is a series connector between the coils of a winding portion closely electrostatically coupled with the preceding shield. Thus, this point is connected by a relatively direct or substantially non-inductive connection to the next succeeding shield. In Fig. 5 the succeeding shields are each arranged only around corresponding successive coil sections of the number beyond the end of the preceding shield, with each shield following the first being conductively connected to an outer intermediate portion of the winding closely coupled electrostatically with the preceding shield.

The invention has been explained by describing and illustrating various forms of electrostatic shield but it will be apparent that arrangements other than those specifically shown may be used without departing from the spirit of the invention and the scope of the appended claims.

What we claim as new and desire to secure by Letters Patent of the United States, is,

1. The combination with a winding of an electrical induction apparatus, said winding including a plurality of disk coils, an electrostatic strip extending along the outer edge of one of said coils and connected to the high voltage terminal of said winding, another electrostatic strip spaced along the outer edge of another coil further from said terminal, and another coil connected between said first two coils and the high voltage terminal, said second electrostatic strip being connected to said winding at a point between said first coil and the coil nearest the high voltage terminal.

2. The combination with a winding of an electrical induction apparatus, said winding including a plurality of coil sections, of a plurality of electrostatic shields, each shield surrounding a coil section in close electrostatic coupling therewith, one shield being connected to the high voltage terminal of the winding and successive shields being connected to successively lower voltage points of said winding, each of said successive shields being connected to a point of said winding of higher voltage than any portion of the winding with which it is closely coupled electrostatically.

3. The combination with a winding of electrical induction apparatus, said winding including a plurality of coil sections, a plurality of electrostatic shields, each shield being arranged adjacent a coil section in close electrostatic coupling therewith, one shield being connected to the high voltage terminal of the winding and successive shields being connected to successively lower voltage points of said winding, each of said successive shields being connected to a point of said winding of higher voltage than any portion of the winding with which it is closely coupled electrostatically.

4. In combination with a winding connection to a line terminal comprising a column of series connected coils arranged around a grounded core, means for restricting to desired values the percentage of any voltage suddenly impressed at said terminal which, in the initial distribution, will appear between adjacent coils of said winding, said means comprising a series of shields extending downwardly relative to said terminal around the outside of said column of coils, the uppermost shield being connected to said line terminal and positioned adjacent a group of coils nearest to said terminal, each other shield of the series, taken in consecutive order, in like manner being positioned adjacent a group of coils next farther from the terminal than those under the next preceding shield, all of said shields except the first being directly connected to different points in said winding, each shield to a point in the surface of the winding next adjacent to and intermediate the ends of the preceding shield and farther from said terminal than that to which the next preceding shield of the series is connected.

5. A winding having a terminal and comprising a stack of coil sections arranged around a grounded core, means for substantially neutralizing the effect of the capacitance between a predetermined number of said coil sections nearest said terminal and ground so as to effect a distribution of a high voltage transient suddenly impressed upon said terminal over said predetermined number of said coil sections, said means comprising a plurality of electrostatic shields arranged around the outer circumference of said number of coil sections, the first of said shields surrounding a plurality of said number of coil sections immediately adjacent said terminal, the succeeding shields each arranged only around corresponding successive coil sections of said number beyond the end of the preceding shield, each of said shields following the first being conductively connected to an outer intermediate portion of the winding closely coupled electrostatically with the preceding shield, said conductive connection being substantially non-inductive whereby capacitance charging currents are transmitted from each preceding shield to the succeeding shields to establish progressively decreasing voltages on said shields.

6. In combination with a winding of an electrical induction apparatus having a high voltage terminal, means for distributing a suddenly impressed voltage over said winding comprising a plurality of electrostatic shields arranged adjacent the outer periphery of successive portions of said winding and in close electrostatic coupling therewith, the first of said shields being connected to the high voltage terminal of said winding, the second of said shields having a portion arranged over a portion of the surface of said first shield opposite said winding for receiving transient charging current therefrom by direct capacitive coupling therewith, and substantially non-inductive means connecting said second shield to said winding between the lower voltage end of the portion of said winding adjacent said first shield and said high voltage terminal.

7. In combination with a winding of an electrical induction apparatus, means for distributing a suddenly applied voltage over said winding comprising a first electrostatic shield arranged adjacent a first portion of said winding and in close electrostatic coupling therewith, said first shield being connected to the terminal of said winding, a second electrostatic shield arranged adjacent a second portion of said winding adjacent said first portion and in close electrostatic coupling with said second portion, said second shield being connected directly and substantially non-inductively to an intermediate part of said first portion of the winding, a portion of said second shield arranged adjacent the surface of said first shield opposite said first winding portion.

8. In combination with a winding of electrical induction apparatus having distributed shunt capacitance to ground, means for distributing over said winding a voltage suddenly impressed upon a terminal thereof, said means comprising a plurality of electrostatic shields wholly disposed in close electrostatic coupling with the outer circumference of different successive portions of said winding, the first of said shields being connected to said terminal, the succeeding shields being connected to successively lower voltage points of said winding, each of said succeeding shields being connected to a point of said winding of higher voltage than any portion of the winding with which it is closely coupled electrostatically.

9. In combination with a winding comprising a column of relatively flat series connected coils disposed around a core, means including a plurality of series, capacitance coupled, electrostatic shields for distributing a surge voltage which may appear at a terminal of said winding in desired proportions among the respective coils, said shields each comprising a group of connected insulated ribs, each of said ribs being arranged adjacent the outer periphery of a corresponding coil, the first shield nearest the terminal being connected to said terminal, and means including a series connector between coils of a winding portion closely coupled electrostatically with said first shield, and a substantially non-inductive connection from said connector to the next succeeding shield for transmitting charging current to it and successive shields.

10. In combination with an electrical induction apparatus including a winding having distributed shunt capacitance between the turns and ground, means for distributing over said winding a voltage suddenly impressed upon a terminal thereof, said means comprising an electrostatic shield connected to said terminal and disposed around the outer surface of a first portion of said winding adjacent said terminal, a second electrostatic shield disposed around the outer surface of a second successive portion of said winding, said second shield being substantially non-inductively connected to an intermediate point in the outer surface of said first portion of said winding.

11. In combination with electrical induction apparatus including a winding having distributed shunt capacitance between turns and ground, means for distributing over said winding a voltage suddenly impressed upon a terminal thereof, said means comprising a plurality of electrostatic shields respectively disposed in close electrostatic coupling with successive portions of said winding, and said means including surface portions of the winding adjacent to and in close electrostatic coupling with corresponding shields, a point on each of said surface portions being conductively and substantially non-inductively connected to a succeeding shield for furnishing transient charging current thereto, each of said connection points being at a higher voltage during normal operation of said apparatus than any part of said winding which is electrostatically coupled with the shield to which said point is connected.

12. In combination with a winding of electrical induction apparatus, means for distributing over said winding a voltage suddenly impressed upon a terminal thereof, said means comprising a plurality of capacitance elements electrostatically coupled in a series relation and associated with a predetermined fractional part of said winding, the first of said elements being connected to said terminal and being closely electrostatically coupled with a portion only of said winding part nearest said terminal, and different successive capacitance elements being closely electrostatically coupled with corresponding different successive portions only of said winding part, each of said capacitance elements except said first being substantially non-inductively connected to a point substantially in the surface and intermediate the ends of the winding portion closely electrostatically coupled with the next adjacent and preceding capacitance element.

JAMES M. WEED.
JACK R. MEADOR.